United States Patent [19]
Thamm et al.

[11] Patent Number: 5,249,289
[45] Date of Patent: Sep. 28, 1993

[54] SYSTEM AND METHOD FOR REBUILDING EDITED DIGITAL AUDIO FILES

[75] Inventors: Howard C. Thamm, Dallas; Michael D. Wilkes, Austin, both of Tex.

[73] Assignee: International Business Machines Corporation, Armonk, N.Y.

[21] Appl. No.: 413,922

[22] Filed: Sep. 28, 1989

[51] Int. Cl.[5] ............................ G06F 7/00; G06F 7/06
[52] U.S. Cl. .................................. 395/600; 364/962; 364/962.1; 364/962.2; 364/963.3; 364/DIG. 2
[58] Field of Search ............................ 395/600

[56] References Cited

U.S. PATENT DOCUMENTS 4,868,687  9/1989  Penn et al. ............................ 360/13
4,916,605  4/1990  Beardsley et al. ................... 364/200

OTHER PUBLICATIONS

"Audio Editor System", IBM TDB, vol. 30, No. 12, May 1988, pp. 358-359.
"Screen Format for a Basic Audio Editor", IBM TDB, vol. 31, No. 9, Feb. 1989, pp. 46-51.
"Audio Object Structure for PC-Based Digital Audio", IBM TDB, vol. 30, No. 10, Mar. 1988, pp. 286-287.
"Volume History Display for a Personal Computer Audio Editor", IBM TDB, vol. 30, No. 10, Mar. 1988, pp. 355-356.
"Basic Editing Functions for a PC Audio Editor", IBM TDB, vol. 30, No. 12, May 1988, p. 21.
"Three-Level Audio Object Display for a Personal Computer Audio Editor", IBM TDB, vol. 30, No. 10, Mar. 1988, pp. 351-353.
"Single Display Panel Structure for a PC Audio Editor", IBM TDB, vol. 30, No. 10, Mar. 1988, pp. 270-271.
"Display of Audio Signal Processor Setup (Hookup) for a PC Audio Editor", IBM TDB, vol. 30, No. 10, Mar. 1988, pp. 383-386.
"Creation/Modification of the Audio Signal Processor Setup for a PC Audio Editor", IBM TDB, vol. 30, No. 10, pp. 367-376.

Primary Examiner—Gareth O. Shaw
Assistant Examiner—A. Katbab
Attorney, Agent, or Firm—Robert M. Carwell

[57] ABSTRACT

A system and method for use in a digitized audio data editing system for efficiently resequencing the audio data having indexes thereto. During resequencing, an audio index range table of such indexes is constructed. The table provides indications of consecutive index ranges of previously processed indexes. By traversing the table during resequencing to determine if a current index is a duplicate of any previously processed index corresponding to a previously copied audio segment, the necessity to compare each index with every index previously copied over is thereby avoided, which otherwise becomes increasingly inefficient as more indexes are copied over and thus the number of indexes to compare expands. Time required to process a resequence is accordingly significantly reduced.

5 Claims, 4 Drawing Sheets

SYSTEM AND METHOD FOR REBUILDING EDITED DIGITAL AUDIO FILES

RELATED CASES

This case is related to my co-pending patent application Ser. No. 07/368,468, (AT9-89-054) filed Jun. 19, 1989 and entitled "Audio Editor Highlighted Display" and Ser. No. 07/368,474, (AT9-89-050) filed Jun. 19, 1989 and entitled "System and Method for Audio Editing", both abandoned.

TECHNICAL FIELD

This invention relates to data processing and, more specifically, relates to the application of data processing to editing of digitized audio information.

BACKGROUND ART

The recording of sound tracks has, in the past, been accomplished by analog devices such as tape recorders. Editing of the sound recordings or sound tracks was conventionally accomplished mechanically by means by splicing tapes or by the recording or bouncing of sound tracks or portions thereof from one track or tape recorder to another, thereby making the editing changes during this process.

With the advent of analog-to-digital and digital-to-analog converters, digital signal processors, and the like being applied to the audio recording arts, efforts have been made to provide for capture and editing of the audio information while in digital form by means of various digital processing systems. One such system currently available is the Audio Visual Connection ™ product available from the IBM Corporation, Armonk, N.Y., which takes the form of an audio peripheral adapter card for performing D/A and A/D of the audio data and installable in a conventional personal computer such as a PS/2 Model 50, and appropriate capture and editing software, both also available from the IBM Corporation (PS/2 is a registered trademark of the IBM Corporation). The accompanying documentation to such a system describes in greater detail the components and operation thereof and the information contained in such documentation is incorporated herein by reference.

Numerous digital systems have been provided for facilitating a user friendly interface and system for effecting editing of digitized audio data under control of a personal computer. Among these are the systems and interfaces disclosed in the following references which are herein incorporated by reference. "Basic Editing Functions for a PC Audio Editor, *IBM Technical Disclosure Bulletin*, Vol. 30, No. 12, May 1988; "Screen Format for a Basic Audio Editor", *IBM Technical Disclosure Bulletin*, Vol. 31, No. 9, February 1989; "Display of Audio Signal Processor Setup (Hook Up) for a PC Audio Editor", *IBM Technical Disclosure Bulletin*, Vol. 30, No. 10, March 1988; "Creation/Modification of the Audio Signal Processor Setup for a PC Audio Editor", *IBM Technical Disclosure Bulletin*, Vol. 30, No. 10, March 1988; "Audio Object Structure for PC-Based Digital Audio", *IBM Technical Disclosure Bulletin*, Vol. 30, No. 10, March 1988; "Single Display Panel Structure for a PC Audio Editor", *IBM Technical Disclosure Bulletin*, Vol. 30, No. 10, March 1988; and "Audio Editor System", *IBM Technical Disclosure Bulletin*, Vol. 30, No. 12, May 1988.

The digitized audio data in such systems is conventionally stored in DOS/OS files having two major components: an audio data file and an index table into the file. Each index in the table represents the offset of the corresponding audio data in the file and points to an audio segment which is simply an addressable unit of audio. Each index table represents one track of audio and refers to a single audio file. In the playback of a sound, the audio index is typically traversed sequentially and the corresponding data from the audio file is read and sent to the aforementioned audio adapter card for processing and playback including conversion to analog form. Provision for such indexes provides many convenient capabilities, as, for example, in the simple repeating of an index in the table resulting in playback of the same physical audio segment multiple times.

When the user edits digitized audio information in the course of using such capture/editing systems, it is conventional for changes to made to the index table and not the actual audio data file itself. Only at the end of an editing session are changes made to the audio data file. Throughout the editing process the user may have deleted index entries (i.e., deleted sound), inserted new index entries (i.e., inserted new sound), or copies existing index entries (i.e., repeated a sound). After the editing process has been completed by the user, the audio data file must be updated to reflect the changes which have occurred in the edited index. Accordingly, if an index in the table has been deleted, although it will thus no longer exist in the table, the corresponding digitized audio data will still remain in the file. As digitized audio files of any practical length typically occupy rather large quantities of computer memory, and as this memory space, due to cost factors, is often at a premium, it is essential to recover such space in a process referred to as a "resequence" or "garbage collection".

A resequence is essentially accomplished by traversing the edited audio index sequentially and copying each valid index's audio data to a new file. The original index table entry is thence modified to reflect the new offset in the target file. At the end of the resequence, the old file is deleted, and the new file receives the original file's name. In this way, if an audio segment in the original file does not have an index pointing to it, it will not be copied to the new file.

Repeated indexes which refer to the same physical audio segment in the original file will also be repeated and refer to the same physical audio segment in the new file. The first time an index is encountered during a resequence, its corresponding audio segment is copied to the new file. Each subsequent index which refers to this same sound will not cause another data copy, but its index will simply be reset to the new file offset location of the previously copied sound segment.

The original audio index table in the prior art is not actually updated to reflect the new offset position. Rather, a new audio table is created and updated to reflect the new file offset position. At the end of the resequencing procedure, the original audio index table is deallocated and the new table becomes the current table and acts as the index table into the new, resequenced file. The original audio index table and the new audio index table are related on a one-to-one basis of course. In this way, for any original index which has been copied over, its new file offset may be determined by simply consulting the new index table at the same position. In essence, then, a "look up" table of old file offsets/new file offsets is thereby created as audio data is copied over.

For each index in the original audio index table, it may be determined if the index's audio data has been already copied over to the new file. To do this, the current index is compared with each index which has already been copied over. If a match occurs with a previously copied index, this index's new file offset will be retrieved from the same position in the new audio index or "look up table". This index is then placed into the new audio index table at the position of the current index. In this manner, multiple indexes can point to the same physical audio segment or "sound".

The problem however with this approach in the prior art is that each index must be compared with every index which has already been copied over. As more indexes are copied over, the number of indexes to compare also grows. This can be extremely time consuming if there are a large number of indexes. Because the base operation of resequencing is a complete copy of the audio data file, the minimum time required for a resequence is at least the same amount of time required for a DOS copy. As indicated in the following Table 1, typical usage examples employing the aforementioned conventional system for garbage collection are shown:

SPEED TIMINGS TABLE 1

|  | # of indexes | IBM PS/2 Model 50 | | |
|---|---|---|---|---|
|  |  | file length | DOS copy | Resequence |
| 1) | 4840 | 4.6 Meg | 1:27 | 22:25 |
| 2) | 4440 | 4.2 Meg | 1:20 | 20:25 |

It will be noted from the foregoing that the resequencing time required is substantially larger than that required for a DOS copy. However, it should be readily apparent that the times for resequencing should desirably approach the time for a DOS copy for the same file in order to be an acceptable solution and to provide for a practical audio editing system.

It would thus be highly desirous to provide a data processing application system for facilitating the editing of digitized data which substantially reduced the time required for resequencing in the editing process.

SUMMARY OF THE INVENTION

A system and method for use in a digitized audio data editing system for efficiently resequencing the audio data having indexes thereto. During resequencing, an audio index range table of such indexes is constructed. The table provides indications of consecutive index ranges of previously processed indexes. By traversing the table during resequencing to determine if a current index is a duplicate of any previously processed index corresponding to a previously copied audio segment, the necessity to compare each index with every index previously copied over is thereby avoided, which otherwise becomes increasingly inefficient as more indexes are copied over and thus the number of indexes to compare expands. Time required to process a resequence is accordingly significantly reduced.

In a preferred embodiment, a system and method is provided for use in a digitized audio data editing system for resequencing digitized audio data comprising the steps of generating during said resequencing an audio index range table of said indexes indicating consecutive ranges in said table of previously processed said indexes; and searching said table to determine if a current said index is a duplicate of any said previously processed said indexes.

BRIEF DESCRIPTION OF THE DRAWINGS

The novel features believed to be characteristic of the invention are set forth in the appended claims. The invention itself, however, as well as other features and advantages thereof, will be best understood by reference to the following description of the preferred embodiment, when read in conjunction with the accompanying figures, wherein:

DETAILED DESCRIPTION OF THE PREFERRED EMBODIMENT

Figure 1A:
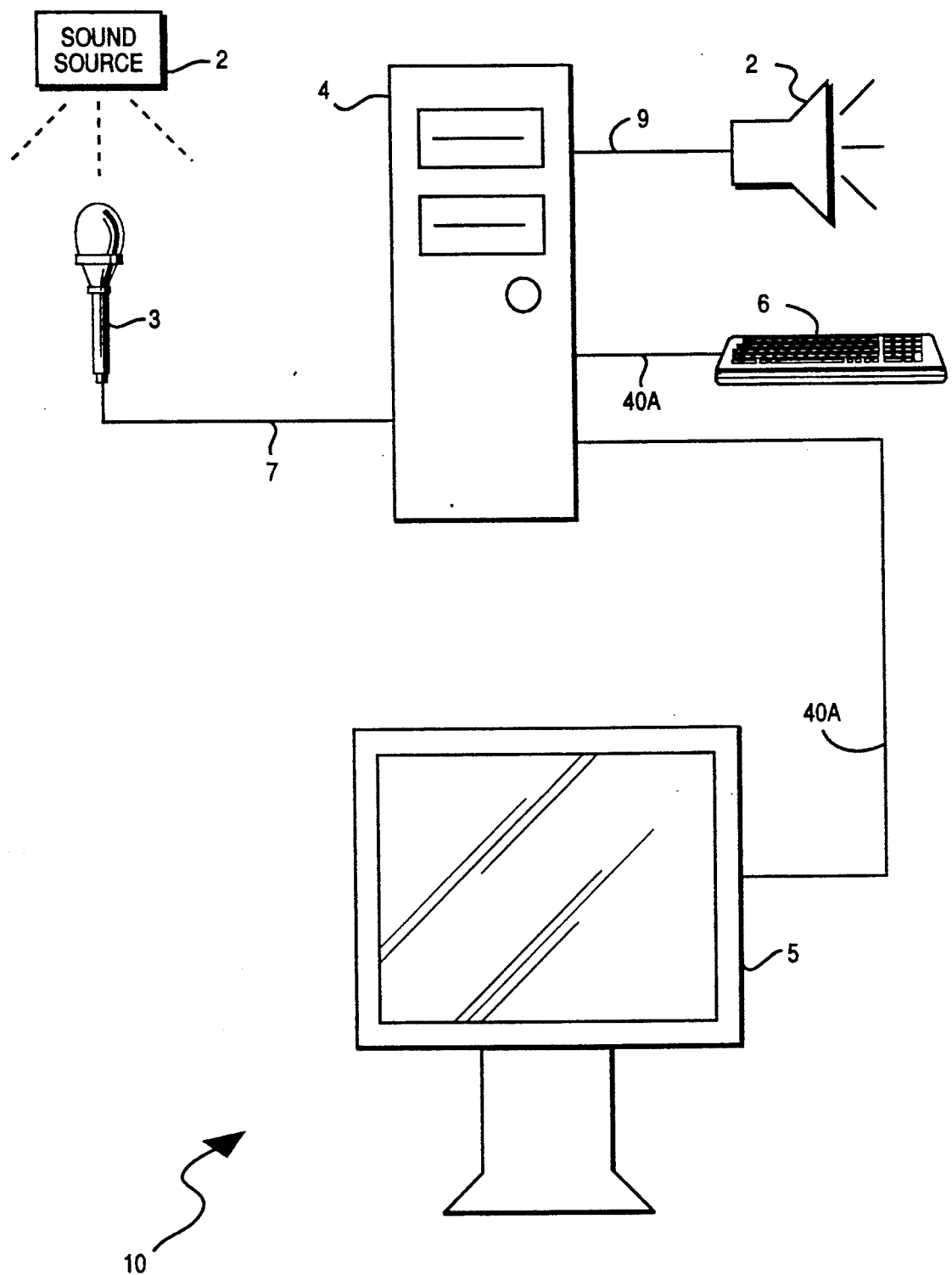
FIG. 1A is a block diagram of a data processing system configured as an audio capture and editing system for digital audio data.

Before discussing the detailed operation of the program employed in effecting the invention, an example of a representative problem solution in accordance with the teachings of the invention will be provided. The benefits and solution provide by the invention are based upon an observation that a typical edited audio index table (and accordingly the resulting sound) in practice normally consists of several long runs of consecutive audio indices. When searching for a particular index, if it is known that the table consists of such long runs of consecutive indices, this information may be employed to speed up the associated index searches.

As each index in the original index table has its audio data copied over to the new file, a table is built indicating all consecutive ranges which exist in this audio index table. The purpose of the range table is to determine if the current index is a duplicate of a previously copied audio segment. The following is an illustrative range table which may be used to illustrate the operation of the invention:

RANGE TABLE 2

|  | Mix Index of Range | Max Index of Range | Min Table Position |
|---|---|---|---|
| 1) | 10 | 1000 | 15 |
| 2) | 1002 | 2400 | 800 |
| 3) | 3000 | 4600 | 2300 |

The ranges in the above table indicate which indices have been processed so far. For example, range 1 indicates that indexes 10–1,000 inclusive exist somewhere in the audio index table and have been copied over to the new file. Entries in the "Min Table Position" indicate the position where the first index of this corresponding range was encountered in the original audio index. In other words, all indexes in this range occur somewhere at or after this position in the original audio index table. Each search of the range table starts where the previous search ended. This prevents unnecessary searching of other ranges when processing long runs of consecutive indices.

The following possibilities exist when searching and/or building such a range table:

1. The current index is included in one of the ranges in the table.

This indicates the index is in the table and it's corresponding audio data has already been copied to the new file. To obtain the new offset position of the previously copied audio data segment, the original audio index may be searched starting at the position defined by the "Min Table Position" for the current range. Once the match is found, the lookup table (1:1) may be consulted at the matched table position and the index's new file offset thereby retrieved.

2. The current index is one less than a range's Min value.

In this case the current index's data has not yet been copied to a new file. Table 3 which follows should next be considered having a current index equal to 1001 (assuming the Range Table search commenced at the range position 2):

RANGE TABLE 3

|   | Mix Index of Range | Max Index of Range | Min Table Position |
|---|---|---|---|
| 1) | 10 | 1000 | 15 |
| 2) | →1002← | 2400 | 800 |
| 3) | 3000 | 4600 | 2300 |

Range 2's Min may be expanded because a new index has been found which expands an existing range. The current index thus becomes this new range's new Min value thereby yielding in the results shown in the Range Table 4 which hereinafter follows.

In collapsing the range table, if this new Min value is one away from the previous range's Max value, these two ranges form a single range and can be combined in the Range Table. The following table may thus be considered with the index 1001 expanding Range 2:

RANGE TABLE 4

|   | Mix Index of Range | Max Index of Range | Min Table Position |
|---|---|---|---|
| 1) | 10 | 1000 | 15 |
| 2) | →1001← | 2400 | 800 |
| 3) | 3000 | 4600 | 2300 |

It will thus be noted from the foregoing how the combination of Ranges 1 and 2 actually form one range. The Range Table may thus be collapsed to reflect this as shown in the next range table:

RANGE TABLE 5

|   | Mix Index of Range | Max Index of Range | Min Table Position |
|---|---|---|---|
| 1) | 10 | →2400← | 15 |
| 2) | 3000 | 4600 | 2300 |

It will be observed that the lower of the two Min Table positions (i.e., "15" in the above Table 5) is chosen because no indexes of either range occur before this point.

3. The current index is one greater than a Range's Max value.

In this case the index's data has not yet been copied to a new file. The following Table 6 may thus be considered with a current index equal to 1001 (assuming the Range Table search commenced at range position 1):

RANGE TABLE 6

|   | Mix Index of Range | Max Index of Range | Min Table Position |
|---|---|---|---|
| 1) | 10 | →1000← | 15 |
| 2) | 1002 | 2400 | 800 |
| 3) | 3000 | 4600 | 2300 |

Range 1's Max may be expanded because a new index has been found which expands an existing range. The current index thereby becomes this range's new Max value, the result of which may be seen depicted in the accompanying Table 7 which hereinafter follows.

In collapsing the Range Table, if this new Max value is one away from the following range's Min value, these two ranges form a single range and can be combined in the Range Table. The following Table 7 may thus be considered with the index 1001 expanding Range 1:

RANGE TABLE 7

|   | Mix Index of Range | Max Index of Range | Min Table Position |
|---|---|---|---|
| 1) | 10 | →1001← | 15 |
| 2) | 1002 | 2400 | 800 |
| 3) | 3000 | 4600 | 2300 |

It will be noted that the combination of Ranges 1 and 2 actually form one range. The table may accordingly be collapsed to reflect this as shown in the following Table 8:

RANGE TABLE 8

|   | Mix Index of Range | Max Index of Range | Min Table Position |
|---|---|---|---|
| 1) | 10 | →2400← | 15 |
| 2) | 3000 | 4600 | 2300 |

The lower of the two Min Table positions ("15" in Table 8 above) is chosen because no indexes of either range occurred before this point.

4. The current index is not included in any of the ranges and is not one index away from any range in the table (that is to say, not able to expand an existing range). The current index's data has not yet been copied to a new file in this case. A range is thus created in the Range Table with both Min and Max values equal to the current index. The Min Table Position is thus set equal to the position of the current index in the original audio index table.

By using the hereinabove thus described system and method of the invention, the time required to process a resequence may be significantly reduced. In the following Table 9, an illustrative typical usage example is provided giving a comparison of results of using the prior art techniques and the novel technique of the subject invention for implementing resequence:

SPEED TIMINGS TABLE 9

| | | IBM PS/2 Model 50 | | |
|---|---|---|---|---|
| # of indexes | file length | DOS copy | Resequence | Ranging Reseq |
| 1) 4840 | 4.6 Meg | 1:27 | 22:25 | 1:45 |
| 2) 4440 | 4.2 Meg | 1:20 | 20:25 | 1:33 |

It may be readily perceived that the time for the improved resequence in accordance with the teachings of the invention approaches the time required for the base operation, i.e., a DOS copy.

Figure 1B:
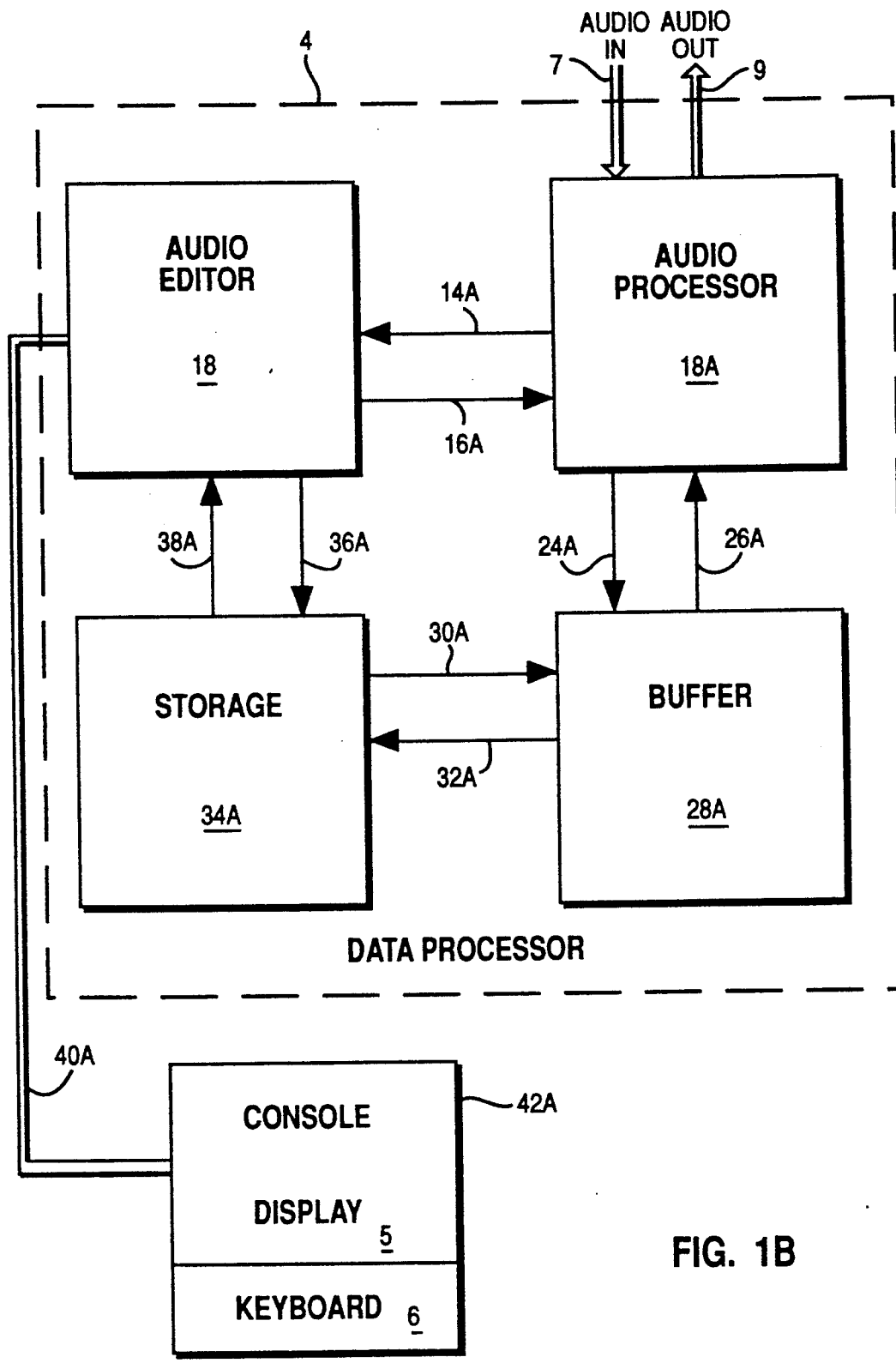
FIG. 1B is a more detailed block diagram of a portion of the data processing system of FIG. 1.

Now that an illustrative example of the operation of the invention has been provided, with reference to FIGS. 1A and 1B, a high level description will be provided of the digitized sound editing system of the present invention which will include a description of the manner in which analog audio data is transformed 1 by the system into digital form for use by the editor. Next, a description of the flow of the program executed by the system for the garbage collection function of the subject invention will be discussed with reference to FIG. 2. This will be followed by a more detailed description of the resequencing module portion thereof with reference to FIGS. 3.

First with reference to FIG. 1A, a digital audio editing system 10 is depicted which includes a digital computer 4, preferably in the form of a personal computer, a keyboard 6 for providing user input on line 40A to computer 4, and a monitor 5 for providing digital output to the user and prompts through line 40A for user input on the keyboard 6. Included in the computer 4 is an audio processor 18A to be described with reference to FIG. 1B. This processor performs numerous functions but essentially converts analog audio input data on line 7 to digital form whereupon it is edited and processed in digital form by the computer 4 and then converted by the processor 18A to analog form and output on line 9 to a speaker 2 or the like or to some other output device such as the display 5. From FIG. 1A it will be apparent that in one embodiment the system 10 includes a conventional transducer such as a microphone 3 for converting analog sound from a convenient sound source 2 into the electrical form for delivery on line 7 to the processor 18A.

Referring now to FIG. 1B, it will be recalled that this invention is for a digitized audio editor garbage collection system that in its preferred embodiment is implemented on a personal computer. Specifically, in this embodiment, an IBM Model 70 Personal Computer manufactured by the International Business Machines Corporation, Armonk, N.Y., is used. This computer, consistent with FIG. 1A is designated in block form with reference number 4. The processor has an audio editor 18 which includes the audio editor program being executed by the processor. Also included are storage 34A, which can consists of both disk and RAM (random access memory) storage, and a buffer storage 28A that interfaces between the storage 34A and audio processor 18A. The buffer storage 28A may be a cache or a series of caches of a suitable size for the tasks to be performed by the audio editor of block 18. The audio processor, as previously noted, receives an audio analog input on line 7 and provides an analog audio output on line 9. Although with reference to FIG. 1, external mechanism has been depicted for converting this analog audio data into the digital form required by the system 10, this was done for sake of completeness and for purposes of illustration. It will be readily perceived that the audio garbage collection system and method of the invention is readily adapted for use with audio data which is already stored in digitized form by any number of means well known in the art.

Still referring to FIG. 1B, the audio processor 18A may be in the form of any of a number of commercially available processors whose function is to convert analog data into digital form and thence to reconvert it to analog form under control of a bus of the computer 4. Accordingly, in one embodiment the audio processor 18A may take the form of an Audio Capture and Playback Adapter available from the International Business Machines Corporation. This embodiment of the audio processor includes the Texas Instruments TMS320C25 signal processor. As previously noted the purpose of the processor 18A in part is to digitize audio signals input on line 7 to provide digital data representative of the audio information input and subsequently to convert digital data from storage 34A in the data processor 4 to an analog signal which is output on audio line 9.

The terminal 42A connected to the data processor 4 via line 40A may be recognized as consisting in this embodiment of the console display 5 and a keyboard 6 which are both of conventional design.

In FIG. 1B, the audio editor 18 communicates with the audio processor 18A over lines 14A and 16A. The audio editor 18 also communicates with the storage 34A over lines 38A and 36A. Data is passed between the audio processor 18A and the storage 34A on lines 38A and 36A, and further passes through the buffer 28A via lines 24A, 26A, 30A and 32A. Control of the audio editor function is accomplished by the audio editor software represented as block 18, the flow and detailed description of which are hereinafter provided with reference to II in which the executive routine of the audio editor software is illustrated.

Figure 2:
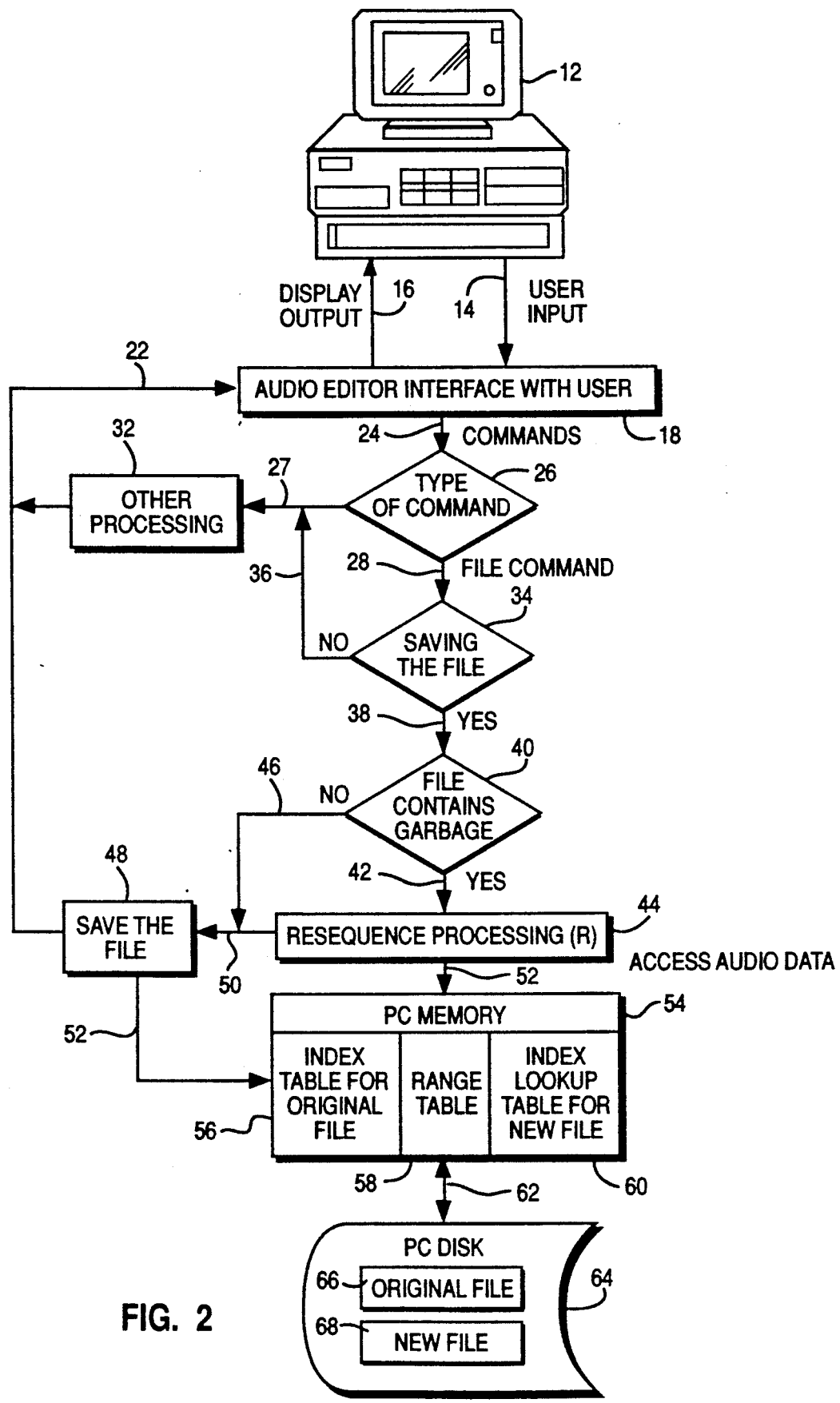
FIG. 2 is a flow diagram indicating a portion of the audio editor executive routine executed by the system of FIG. 1.
Figure 3:
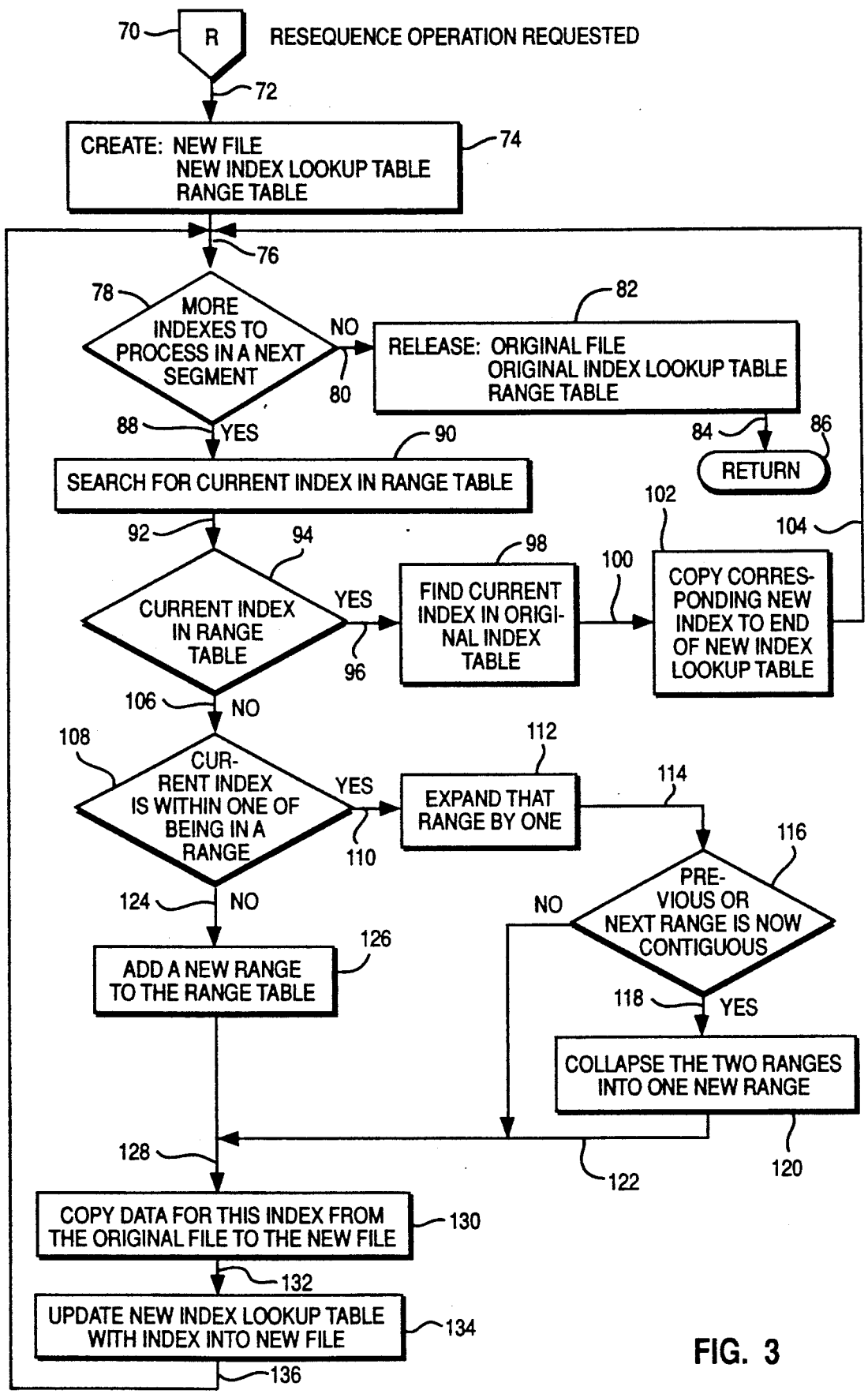
FIG. 3 is a more detailed flow diagram of the resequence processing module of the audio editor executive routine flow diagram depicted in FIG. 2.

Now that an overall description of the environment in which the invention preferably executes has been provided, a more detailed description of the problem addressed and solved by the invention will be provided with reference to FIGS. 2 and 3.

The external interface of the system 10 is intended to facilitate the editing of different types of data objects within an audio file of the computer 4. These objects may be "cut" and "pasted" separately or treated as a single object. Managing these editing operations and maintaining the original relationships between the objects being edited is achieved with appropriate editing software. This invention relates to the efficient rebuilding and management of the audio files, and resequencing, e.g., garbage collection, after the editing operation choices have been completed.

The system 10 previously described allows for the capture and editing of digital audio data. This audio data may be stored conventionally in computer files such as those associated with the DOS, OS, or other operating systems and have two basic data objects available for editing by the user: the audio index object and the commentary or "points" objects.

The audio object data type is a set of integer offsets which index into a file of digitized audio. Each offset in this index represents the minimum granularity of digitized audio which can be randomly retrieved and played by the system 10. This minimum amount of digitized audio will be referred to as one audio segment herein. All computerized access to the digitized and stored audio is via these integer offsets. A play time is associated with every offset in the file, and this play time is the user interface into the audio file. To play the sound at seconds number 10-15 in the audio file, for example, the indexes associated with seconds 10-15 are used to retrieve the digitized audio from the computer storage. Further information on the editing operations and file structures may be obtained with reference to the aforementioned Audio Visual Connection TM system and accompanying documentation.

Referring now to FIG. 2 a personal computer 12 is shown including a means to receive user input 14 by means of a mouse or a keyboard and some form of display screen like a computer terminal for display of output 16. A software interface of the audio editor is provided as represented at reference numeral 18 to facilitate the user input at the keyboard or the mouse, and to provide the output displayed on the screen for the audio editor functions. Proceeding down path 24, when the user types a command, at decision block 26, if it is not a file processing type command, the program flow proceeds along path 27 to block 32, where other processing is done as required, and then moves up path 22 to again look for input from the user at 18. Referring to decision block 26, if the command is a file processing command, the flow moves down path 28 to decision block 34. If the user is requesting that a file not be saved, then the process moves up path 36 again to block 32 which represents other processing.

Continuing now at decision block 34, if the user is requesting that the file be saved, flow is continued down path 38 to decision block 40 which is a test to determine if there is garbage in the file, i.e., if the file needs to be resequenced. If there is no garbage in the file, flow proceeds down path 46 to box 48 and the file is saved, which entails writing the file indexes and any data in memory to disk. At that point, flow moves up path 22 and again the process looks for input from the user through the interface 18. At decision block 40, if the user has requested saving of the file and there is garbage in the file, then the routine moves down path 42 to do resequence processing at box 44 (to be hereinafter described in greater detail with reference to FIG. 3). This involves accessing the audio data at reference numeral 52 that is in memory 54, including the index table 56 for the file which basically includes pointers indexing into offsets into the data file of digitized audio data, i.e., pointers into various blocks of data. The process will also create in memory, as shown at reference numeral 54, a new index table 60, whereby any pointers that are in the original index table and are no longer necessary will not be copied over at the end of the resequence, as shown by the index table block 60. There is also a range table 58 in memory which is a data structure that is used to convert the data from a new index table to the old index table. Referring back to block 44, the end of resequence processing means that the file has been resequenced. It is then necessary to save the results, as shown at block 48, whereupon flow proceeds up path 22 back to system interfacing with the user at reference numeral 18.

There are also structures which in order to get data out on the disk move through the PC memory and then on to the disk and, by the same token, pull data off the disk and move through the PC memory, such data structures being represented at reference numeral 62. The disk itself is represented at reference numeral 64. During resequence, there is an original file that is out on a disk, as shown at reference numeral 66, which is actually what is resequenced. The result of the resequence is the new file without any garbage in it, shown at reference numeral 68.

Referring now to FIG. 3, the resequence processing subroutine 44 of FIG. 2 which is branched to is depicted in greater detail commencing at the subroutine entry point 70 at which the resequence operation is requested. This is the point where resequence is known to be needed. Proceeding down path 72, first at block 74 a new file is created to remove the resequence data into a new index lookup table that will replace the old index table. A range table is also created that will be used in the resequence, these new files, index lookup and range tables being created in the PC memory 54. Resequence processing will continue as long as indexes remain. Proceeding down path 76 to decision block 78, if there are no more indexes to process in a next audio segment flow proceeds down path 80 whereupon the original file is released. The new file would take its place at this point. The original index table would also be released and the new index lookup table in memory would take its place. Also the range table, which is just a temporary structure, would be released, these releasing steps being indicated at reference numeral 82.

At block 82, after releasing the file, index lookup and range tables, flow proceeds down path 84 and returns to FIG. 2 at block 44. Referring now to block 78, if there are more indexes to process in the original index table, then flow proceeds down path 88 to search for the current index being used in the original index table, this table search being indicated at box 90. Flow then proceeds along path 92 to decision block 94. If the current index is found in the range table, process flow proceeds down path 96. This indicates that the data at that index has already been moved to the new file and it simply necessary to know where that data is in the new file. Thus, referring now to block 98, the current index in the original index table is searched for and, once found, flow moves down path 100.

At box 102, that corresponding new index is then copied to the end of the new index lookup table, whereupon flow then proceeds up path 104 to process the next index at decision block 78. As indicated at block 94, if the current index is not in the range table, flow proceeds down path 106 to decision block 108 which is a test to see if the current index is within one index of being in a range. If it is, then flow proceeds down path 110 meaning that range may be expanded to include this index which is accomplished as shown at block 112. Next, flow proceeds down path 114 to decision block 116 which tests to see if the previous or next range is now contiguous. Now that the range it is in has been expanded, this means that two ranges may thus be reduced into one. If that is true, then flow proceeds up path 118 to block 120 and both of the ranges are thenced collapsed into one new range, shown at reference number 120. Flow then proceeds down path 122 to path 128. At decision block 108, which is a test for whether the current index is within one of being in a range, if it is not, then flow proceeds down path 124 and a new range is added to the range table at block 126. Flow then proceeds down path 128 where the data is copied from the old file to the new file as indicated at reference numeral 130. Flow continues to proceed down path 132, whereupon the new index lookup table is updated with the index in the new file, thereby keeping track at reference numeral 134 of where the data was copied to a new file. Flow then proceeds up path 136 to process the next index.

While the invention has been shown and described with reference to particular embodiments thereof, it will be understood by those skilled in the art that the foregoing and other changes in form and details may be made therein without departing from the spirit and scope of the invention.

What is claimed is:

1. A method for us in a digitized audio data editing system implemented with a digital computer for retrieving one or more segments of said data, comprising generating a lookup table during a first resequencing comprised of
- original indexes defining a first order of said segments prior to said first resequencing; and
- new indexes comprised of at least a portion of said original indexes arranged in a second order defining the desired order of at least a portion of said segments when said first resequencing is completed, each of said new indexes having a corresponding one of a plurality of table positions in said lookup table;

generating, during said first resequencing, a copy of said at least a portion of said segments;

generating a range table during said first resequencing comprised of a plurality of entries, each of said entries comprised of
- a minimum and a maximum one of said new indexes which, in combination, define a unique range of consecutive said new indexes; and
- one of said table positions in said lookup table corresponding to said minimum one of said indexes in said lookup table;

selecting a next one of said segments for inclusion in a second resequencing having associated therewith one of said original indexes;

determining, in a search of said range table, whether any of said entries has a said unique range which includes said selected one of said original indexes;

if said any of said entries does not have said unique range, copying said selected next one of said segments to said copy of said at least a portion of said segments, or, alternatively, if said any of said entries does have said unique range, locating said selected one of said original indexes in a search of said new indexes included within said unique range; and retrieving after said determining and locating a segment from said copy as said next one of said segments with one of said table positions of said lookup table corresponding to said located selected one of said original indexes.

2. The method of claim 1, wherein if said any of said entries does not have said unique range, assigning a new table position to said selected next one of said segments in said copy; or alternatively, if said any of said entries does have said unique range, performing said search of said new indexes included within said unique range by the steps of comparing sequentially each of said new indexes in said unique range to said selected one of said original indexes, starting with a first one of said new indexes in said unique range, until a matching new index is detected; and determining one of said table positions in said lookup table corresponding to said matching new index.

3. The method of claim 2 further including, if said any of said entries does not have said range, detecting with said computer if said selected one of said original indexes is within one of being in a said unique range;

expanding with said computer said range in response to said detection that said selected one of said original indexes is within one of being in a said unique range, or, alternatively, in response to detection that said selected one of said original indexes is not within one of being in a said unique range, adding a new range to said range table.

4. The method of claim 3 including further detecting with said computer when said selected one of said original indexes is one greater than a minimum value of said original indexes within a first said range and one less than a maximum value of said original indexes within an adjacent second of said ranges; and consolidating said first and second ranges in said range table into a single range in response to said further detecting step.

5. The method of claim 4 wherein each of said first and second ranges includes a respective associated said minimum table position; and wherein said consolidating step includes storing with said computer the lesser associated minimum table position in associated with said single range in said range table.

* * * * *